US011892931B2

(12) United States Patent
Borkar et al.

(10) Patent No.: US 11,892,931 B2
(45) Date of Patent: Feb. 6, 2024

(54) CHANGE DELIVERY AND PERFORMANCE OF APPLICATIONS BASED ON DISPLAYED IMAGE QUALITY

(71) Applicant: Citrix Systems, Inc., Fort Lauderdale, FL (US)

(72) Inventors: Vipin Borkar, Karnataka (IN); Santosh Sampath, Karnataka (IN); Muhammad Dawood, High Wycombe (GB); Vibha Satyanarayana, Karnataka (IN)

( * ) Notice: Subject to any disclaimer, the term of this patent is extended or adjusted under 35 U.S.C. 154(b) by 206 days.

(21) Appl. No.: 17/243,110

(22) Filed: Apr. 28, 2021

(65) Prior Publication Data
US 2022/0365859 A1    Nov. 17, 2022

(51) Int. Cl.
| G06F 11/34 | (2006.01) |
| G06F 9/50 | (2006.01) |
| G06F 3/0481 | (2022.01) |
| H04L 49/20 | (2022.01) |
| H04L 1/00 | (2006.01) |
| H04W 28/16 | (2009.01) |

(52) U.S. Cl.
CPC ........ G06F 11/3438 (2013.01); G06F 3/0481 (2013.01); G06F 9/5077 (2013.01); G06F 11/3409 (2013.01); G06F 11/3466 (2013.01); H04L 1/0017 (2013.01); H04L 49/205 (2013.01); H04W 28/16 (2013.01); *H04Q 2213/13514* (2013.01)

(58) Field of Classification Search
CPC .............. G06F 11/3438; G06F 9/5077; G06F 11/3409; G06F 11/3466; H04L 49/205
See application file for complete search history.

(56) References Cited

U.S. PATENT DOCUMENTS

| 11,221,375 B1* | 1/2022 | Liu ........................ G01R 31/40 |
| 11,386,663 B1* | 7/2022 | Perea ...................... G06V 20/46 |
| 11,689,600 B1* | 6/2023 | Halepovic ............. H04L 43/091 |
| | | 709/224 |
| 11,770,458 B1* | 9/2023 | Kinnunen ............... H04L 67/60 |
| | | 717/124 |
| 2014/0066052 A1* | 3/2014 | Chang .................... H04L 43/08 |
| | | 455/423 |
| 2015/0154934 A1* | 6/2015 | Spitzer ................... G09G 5/003 |
| | | 345/618 |
| 2021/0385724 A1* | 12/2021 | Wang .................. H04L 41/5051 |

* cited by examiner

*Primary Examiner* — Benjamin C Wu

(57) ABSTRACT

Methods and systems for determining performance of a hosted application are described herein. Determining the performance of a hosted application may require the calculation of scores corresponding to metrics about user experience, including a user workload context, a user action, a frame rate, a round trip latency time, and image quality. The scores associated with the metrics about user experience may be weighted against each other, in accordance with an equation, described herein, to calculate a value corresponding to the performance of a hosted application. Data may be generated and shared with both a virtual computing environment and an administrator of the virtual computing environment. The data may include instructions to optimize user experience within the virtual computing environment. The instructions may be executed by the virtual computing environment to prepare the virtual computing environment for further user interaction.

21 Claims, 13 Drawing Sheets
(6 of 13 Drawing Sheet(s) Filed in Color)

| Image | Noise | Image Quality |
|---|---|---|
| 1010 | Normal | 7.9382017 |
| 1020 | Gauss | 61.8239415 |
| 1030 | Poisson | 34.8313415 |
| 1040 | Salt & Pepper | 60.3461198 |
| 1050 | Speckle | 54.3728021 |

FIG. 10

| 1101 | 1102 | 1103 | 1104 | 1105 |
|------|------|------|------|------|
| UWC  | UA   | FR   | RTLT | ImQ  |
| 5    | 4    | 15   | 20   | 75%  |

FIG. 11

| UA | Score |
|----|-------|
| Typing | 4 |
| Dragging | 2 |
| Scrolling | 3 |
| 3D Mouse | 4 |
| No action | 1 |

FIG. 12

| UWC | Score |
|-----|-------|
| View text | 5 * (% of screen used) |
| View image | 4 * (% of screen used) |
| View video | 4 * (% of screen used) |
| 3D content | 5 * (% of screen used) |
| Audio | 4 |
| Print | 3 |
| Copy | 2 |

FIG. 13

CHANGE DELIVERY AND PERFORMANCE OF APPLICATIONS BASED ON DISPLAYED IMAGE QUALITY

FIELD

Aspects described herein generally relate to computer networking, remote computer access, virtualization, and hardware and software related thereto. More specifically, one or more aspects described herein provide methods to improve operations of hosted applications.

BACKGROUND

Recent advances in virtualization technology permit users to utilize virtual computing environments to run computer programs and computer services on remote servers that normally could be run on physical, local machines. Running a computer program or service in a virtual computing environment allows users to access, from their personal machine, the data and files that would be available at the physical, local machine. To access the data and files that would be available at the physical, local machine, users may use their machines to access a virtualization server. Once connected to the virtualization server, users may submit requests to the access particular computing applications that are available within the virtual computing environment provided by the virtualization server. The requested computer application may appear on the display interface of the user device to simulate the computer application running locally on the user device.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Since virtual computing environments run on virtual machines, there is little static data which can be used to improve system performance. Physical machines are able to improve system performance using information gathered from static elements within the physical computing environment. Examples of these static elements may include data from a graphics-processing unit, a round-trip latency time, data about the physical computing environment, or data about the computer applications that may execute within the physical computing environment. However, improving system performance within a virtual computing environment requires information about the virtual computing environment in addition to any static data that may be available. In a virtual computing environment, resources are shared between individual virtual machines that exist within the virtual computing environment. The performance of the individual virtual machines may affect the performance of the virtual computing environment as a whole. As such, improving system performance within the virtual computing environment requires performance data from the individual virtual machines. Performance data from the individual virtual machines may include an image quality score, a round trip latency time, a frame per second rate, a computer application that is executing within the virtual computing environment, or an action that the user is performing within the virtual computing environment. Today's technology requires users to provide feedback manually back to an administrator to enable assessment of each virtualized session. Manually providing feedback is time consuming for users to complete as it requires users to describe their experience within the virtual computing environment or to rate their experience within the virtual computing environment in response to a series of questions. As such, users may often ignore or overlook requests from the administrator for feedback pertaining to the virtual environment.

To overcome limitations described above, and to overcome other limitations that will be apparent upon reading and understanding the present specification, aspects described herein are directed towards systems and methods for improving hosted application performance.

In an illustrative aspect described herein, a virtualization server may provide a virtual computing environment. A user workload context and a user action may execute within the virtual computing environment. User workload context may correspond to a computer application, selected by the user, that is running, active, and/or has user focus in the virtual computing environment at a particular time. User action may correspond to user workload context as user action indicates the way in which the user interacts with the user workload context. For example, where user workload context corresponds to a word processing application, user action within the word processing application may correspond to typing, scrolling, clicking, copying, printing, or other user actions. In some embodiments, the virtual computing environment may receive a plurality of metrics about user experience. The plurality of metrics may include a user workload context, a user action, a frame per second rate, a round trip latency time, and an image quality analysis. The virtual computing environment may deliver the received metrics to a server for further processing. The analytics engine within the server may gather the received metrics and determine a score for each one of the plurality of metrics. The analytics engine may use the received metrics to generate mock images of the user workload context to determine the image quality score. The analytics engine may use the scores associated with the metrics to calculate a quality of service value by weighting the metrics against each other. The analytics engine may generate a quality of service data (e.g., a report), which may be distributed to the virtual computing environment and to the administrator of the virtual computing environment. The data may contain instructions for optimizing user experience within the virtual computing environment by preparing the virtual computing environment to handle future interaction from the user.

In some embodiments, the methods described herein may be performed by a server. A server may establish a connection with the virtual computing environment. The server may receive a continuous feed of user workload context data and user action data. The server may receive a plurality of quality of service values and may cause the plurality of quality of service values to be displayed within the virtual computing environment. The server may identify aspects of the virtual computing environment where user experience may be improved. As such, the server may deliver instructions for optimizing user experience to the virtual computing environment so that the virtual computing environment may prepare for future interaction from the user.

These and additional aspects will be appreciated with the benefit of the disclosures discussed in further detail below.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete understanding of aspects described herein and the advantages thereof may be acquired by referring to the following description in consideration of the accompanying drawings, in which like reference numbers indicate like features, and wherein:

FIG. 10 depicts illustrative image quality analysis results useful in determining performance of a hosted application in accordance with one or more illustrative aspects described herein.

FIG. 11 depicts illustrative metrics pertaining to user experience that may be used to determine performance of hosted applications in accordance with one or more illustrative aspects described herein.

FIG. 12 depicts illustrative user actions and associated scores that may be used to determine performance of hosted applications in accordance with one or more illustrative aspects described herein.

FIG. 13 depicts illustrative user workload contexts and associated scores that may be used to determine performance of hosted applications in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," "engaged" and similar terms, is meant to include both direct and indirect connecting, coupling, and engaging.

As a general introduction to the subject matter discussed herein, methods and systems are described for determining performance of hosted applications within a virtual computing environment to generate a user experience index corresponding to the virtual computing environment. Determining performance of hosted applications within a virtual computing environment may be done by collecting metrics pertaining to user experience within the virtual computing environment. In doing so, the user is not required to manually provide feedback to an administrator regarding user experience within the virtual computing environment. Determining performance of hosted applications may comprise calculating a value indicative of quality of service using methods and techniques as described herein. To calculate the value indicative of quality of service, a score may be assigned to any of user workload context, user action, frame rate, round trip latency time, and visual image quality. Each of the metrics pertaining to user experience may be weighted against each other to produce the quality of service value. These and additional details are described more fully below.

Computing Architecture

Figure 1:
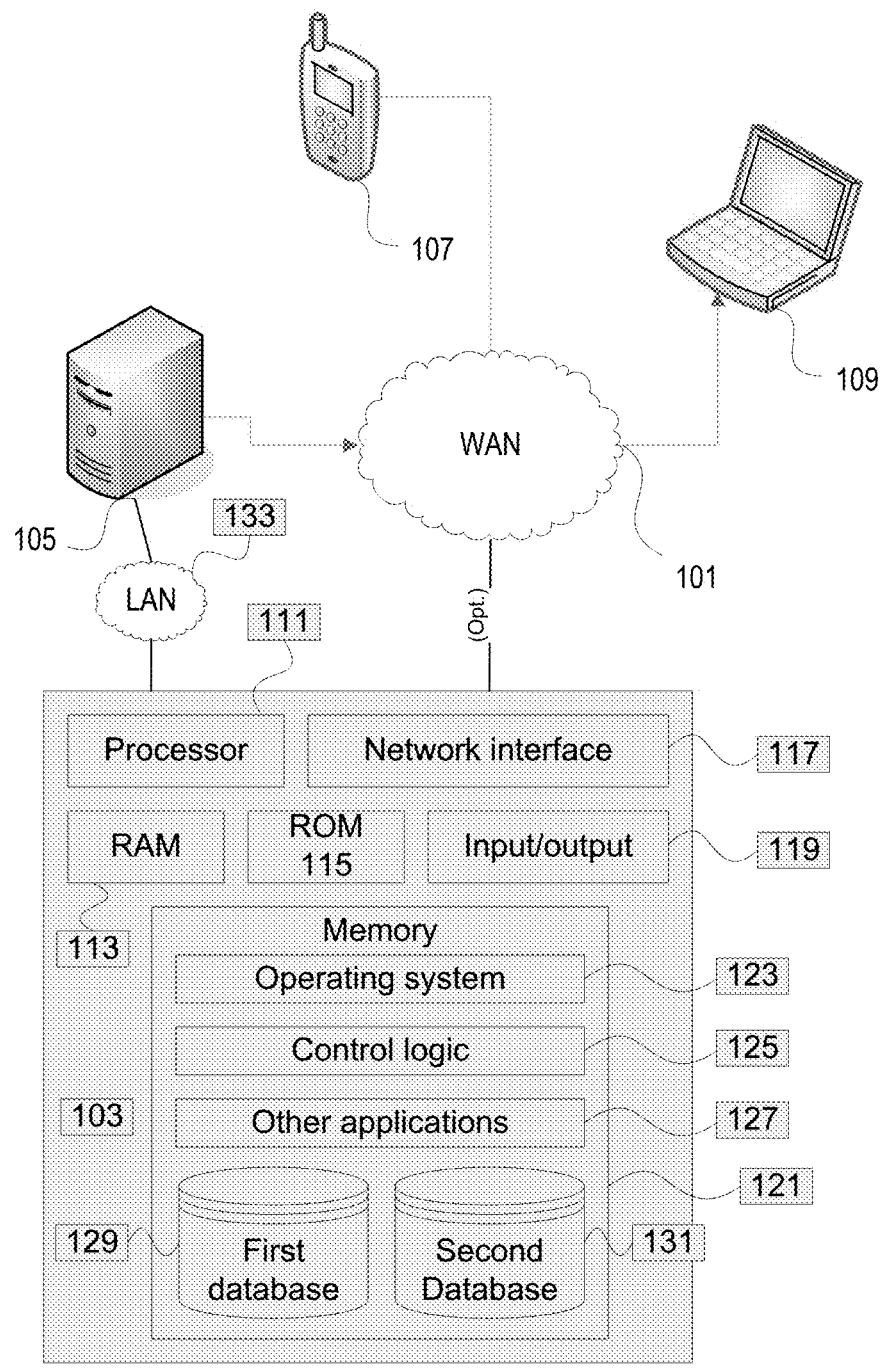
FIG. 1 depicts an illustrative computer system architecture that may be used to improve performance of hosted applications in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
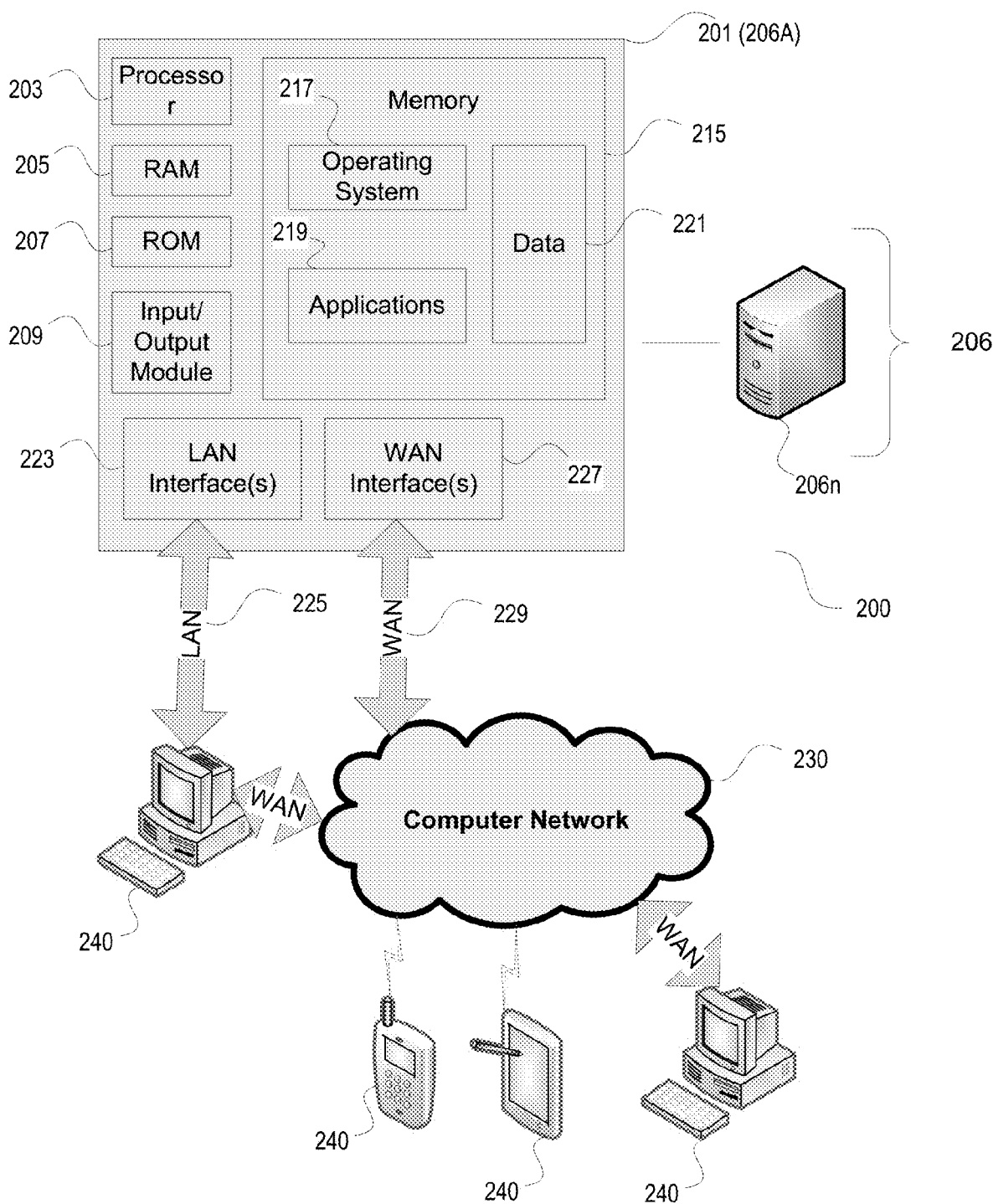
FIG. 2 depicts an illustrative remote-access system architecture that may be used to improve performance of hosted applications in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment, a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s).

The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an output window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
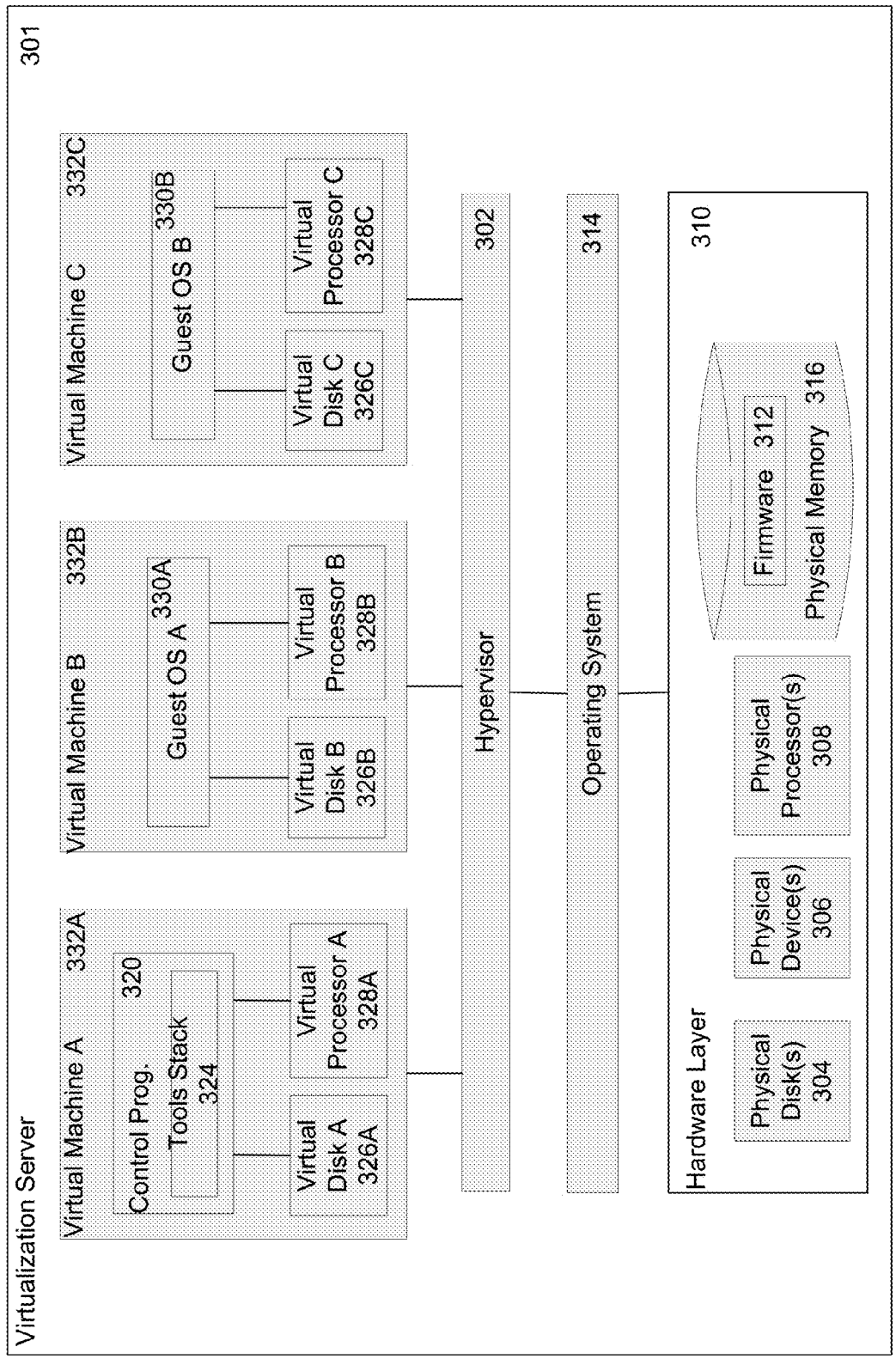
FIG. 3 depicts an illustrative virtualized system architecture that may be used to improve performance of hosted applications in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing component. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same parameters of at least one physical processor 308. In other embodiments, virtual processor 308 provides a modified view of physical processors 308 such that at least some of the parameters of the virtual processor 328 are different than the parameters of the corresponding physical processor 308.

Figure 4:
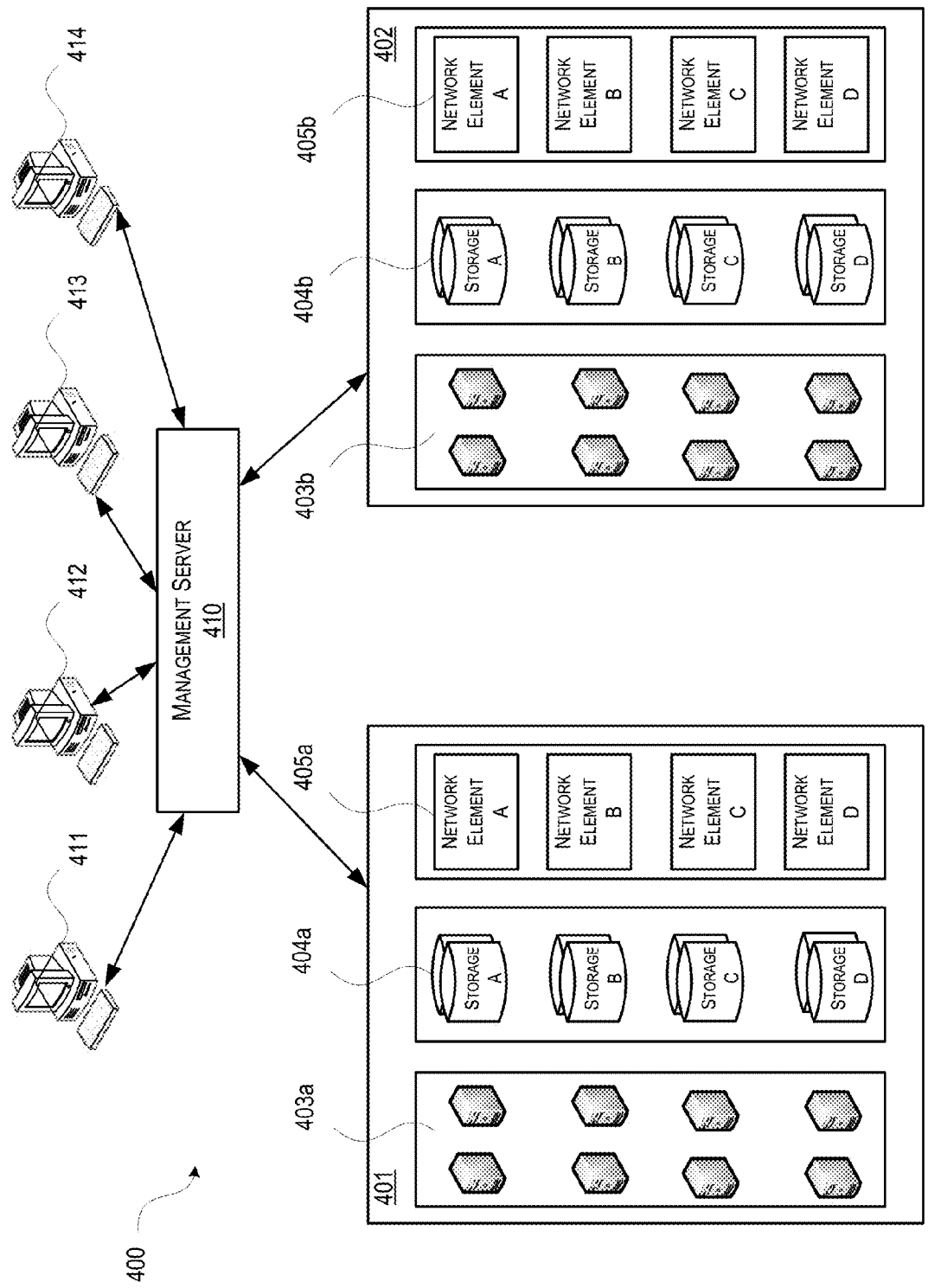
FIG. 4 depicts a desktop and application virtualization system diagram illustrating various components and modules that can be used to improve performance of hosted applications in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403*a*-403*b* (generally referred herein as "host servers 403"), storage resources 404*a*-404*b* (generally referred herein as "storage resources 404"), and network elements 405*a*-405*b* (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Figure 5A:
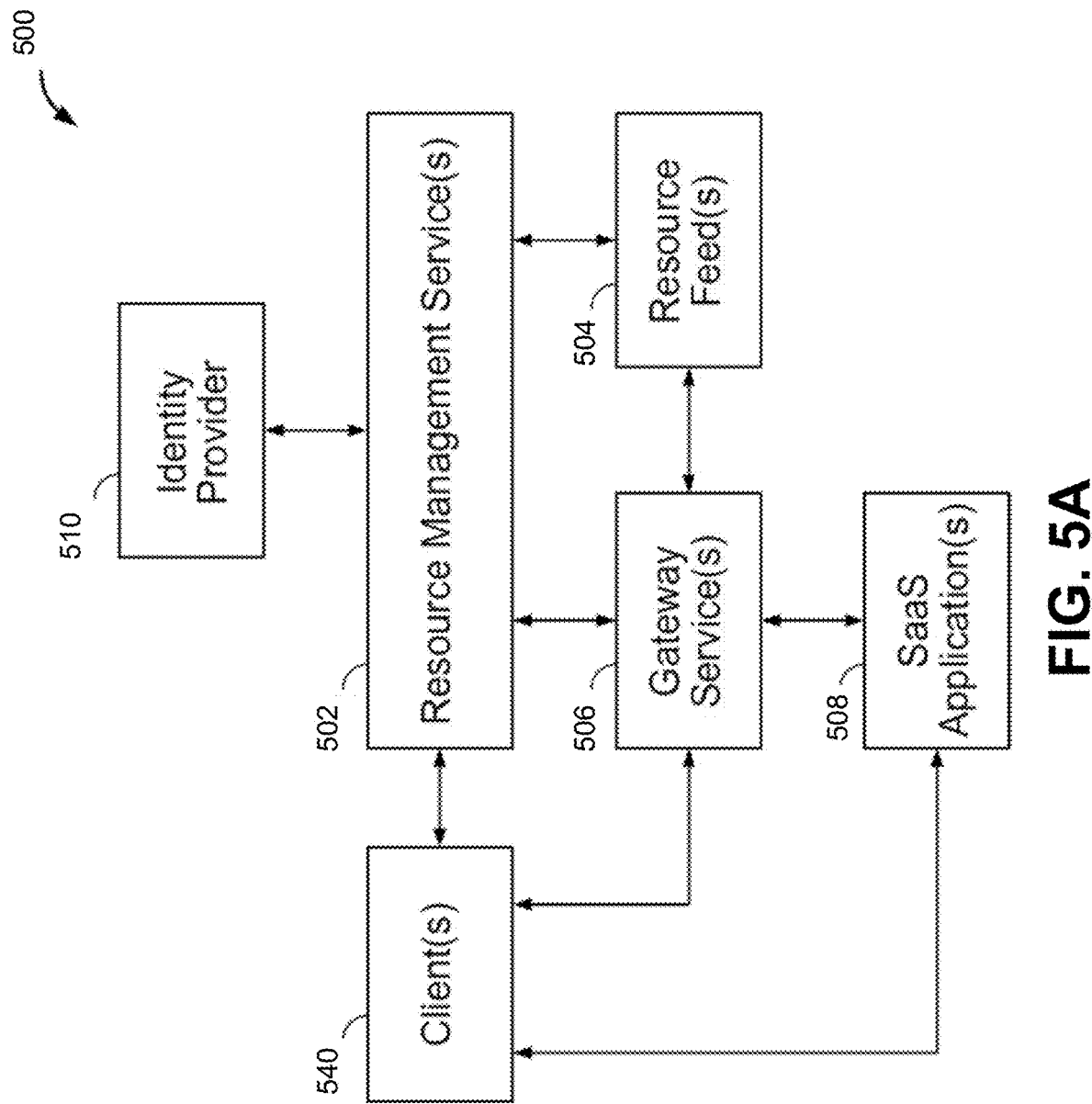
FIGS. 5A-5C depict an illustrative cloud-based architecture in which hosted application performance is evaluated in accordance with one or more illustrative aspects described herein.

FIG. 5A is a block diagram of an example multi-resource access system 500 in which one or more resource management services 502 may manage and streamline access by one or more clients 540 (e.g., desktop computers) to one or more resource feeds 504 (via one or more gateway services 506) and/or one or more software-as-a-service (SaaS) applications 508. In particular, the resource management service(s) 502 may employ an identity provider 510 to authenticate the identity of a user of a client 540 and, following authentication, identify one of more resources the user is authorized to access. In response to the user selecting one of the identified resources, the resource management service(s) 502 may send appropriate access credentials to the requesting client 540, and the client 540 may then use those credentials to access the selected resource. For the resource feed(s) 504, the client 540 may use the supplied credentials to access the selected resource via a gateway service 506. For the SaaS application(s) 508, the client 540 may use the credentials to access the selected application directly.

The client(s) 540 may be any type of computing devices capable of accessing the resource feed(s) 504 and/or the SaaS application(s) 508, and may, for example, include a variety of desktop or laptop computers, mobile phones, tablets, etc. The resource feed(s) 504 may include any of numerous resource types and may be provided from any of numerous locations. In some embodiments, for example, the resource feed(s) 504 may include one or more systems or services for providing virtual computing environments to the client(s) 540, one or more file repositories and/or file sharing systems, one or more secure browser services, one or more access control services for the SaaS applications 508, one or more management services for local applications on the client(s) 540, one or more Internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
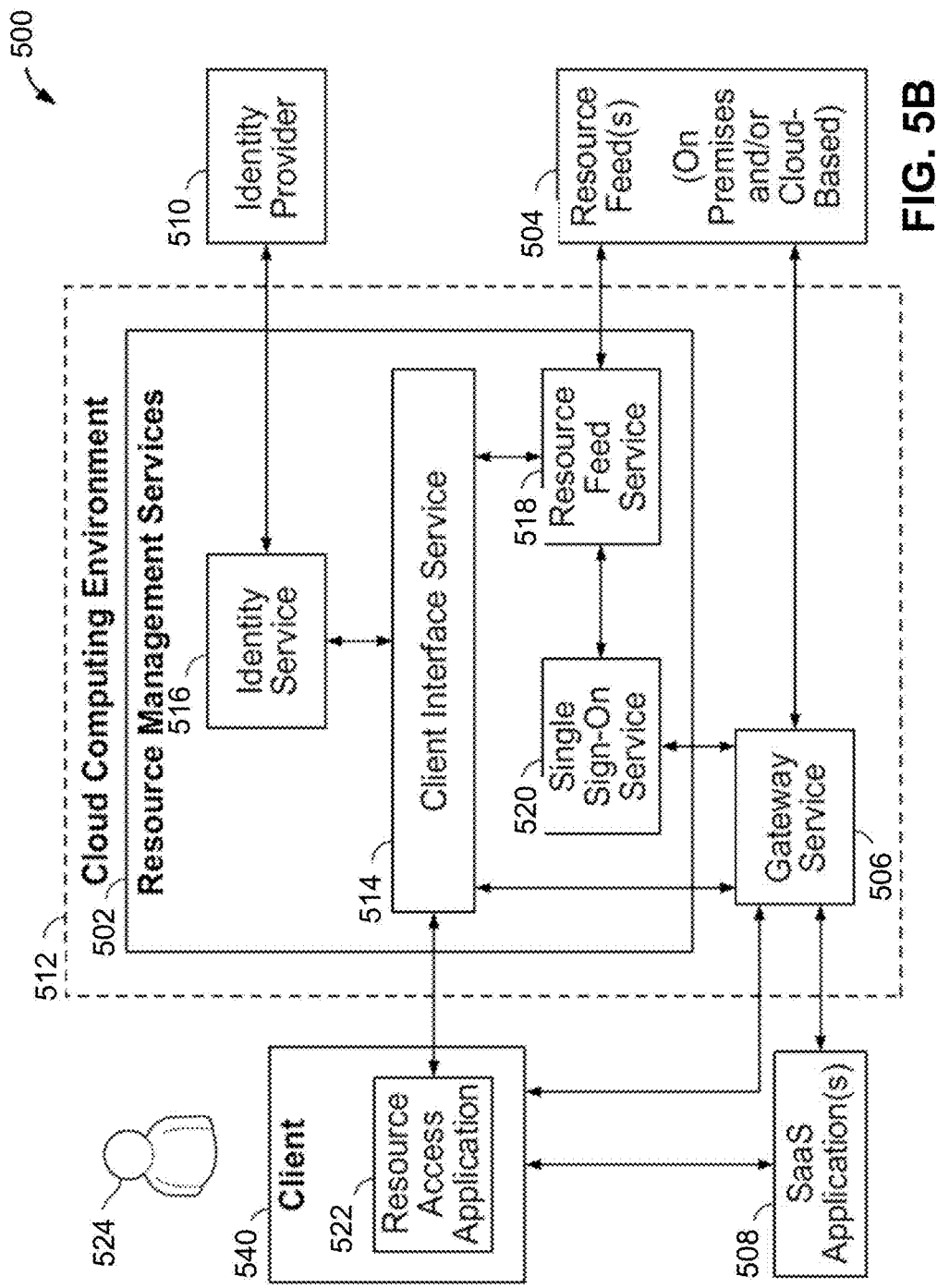

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 540) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 540 may use a resource access application 522 to communicate with the client interface service 514 as well as to present a user interface on the client 540 that a user 524 can operate to access the resource feed(s) 504 and/or the SaaS application(s) 508. The resource access application 522 may either be installed on the client 540, or may be executed by the client interface service 514 (or elsewhere in the multi-resource access system 500) and accessed using a web browser (not shown in FIG. 5B) on the client 540.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 540 to be redirected to the cloud-based identity service to complete an authentication process. The cloud-based identity service may then cause the client 540 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successful authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 540. The list of available resources may, for example, be presented on the user interface of the client 540 as a set of selectable icons or other elements corresponding to accessible resources. The resources so identified may, for example, include one or more file repositories and/or file sharing systems (e.g., Sharefile®), one or more secure browsers, one or more internet enabled devices or sensors, one or more local applications installed on the client 540, and/or one or more SaaS applications 508 to which the user 524 has subscribed. The lists of local applications and the SaaS applications 508 may, for example, be supplied by resource feeds 504 for respective services that manage which applications are to be made available to the user 524 via the resource access application 522. Examples of SaaS applications 508 that may be managed and accessed as described herein may include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 540 may proceed to access the selected resource.

When the user 524 selects a local application, the resource access application 522 may cause the selected local application to launch on the client 540. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 540 may then launch the identified browser and initiate a connection to the gateway service 506. The gateway service 506 may then request an assertion from the single sign-on service 520. Upon receiving the assertion, the gateway service 506 may cause the identified browser on the client 540 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 540 to access the selected SaaS application 508.

In some embodiments, the preferred browser identified by the gateway service 506 may be a specialized browser embedded in the resource access application 522 (when the resource access application 522 is installed on the client 540) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 540 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 540, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 540 to notify a user 524 of something that requires the user's attention (e.g., approval of an expense report, new course available for registration, etc.).

Figure 5C:
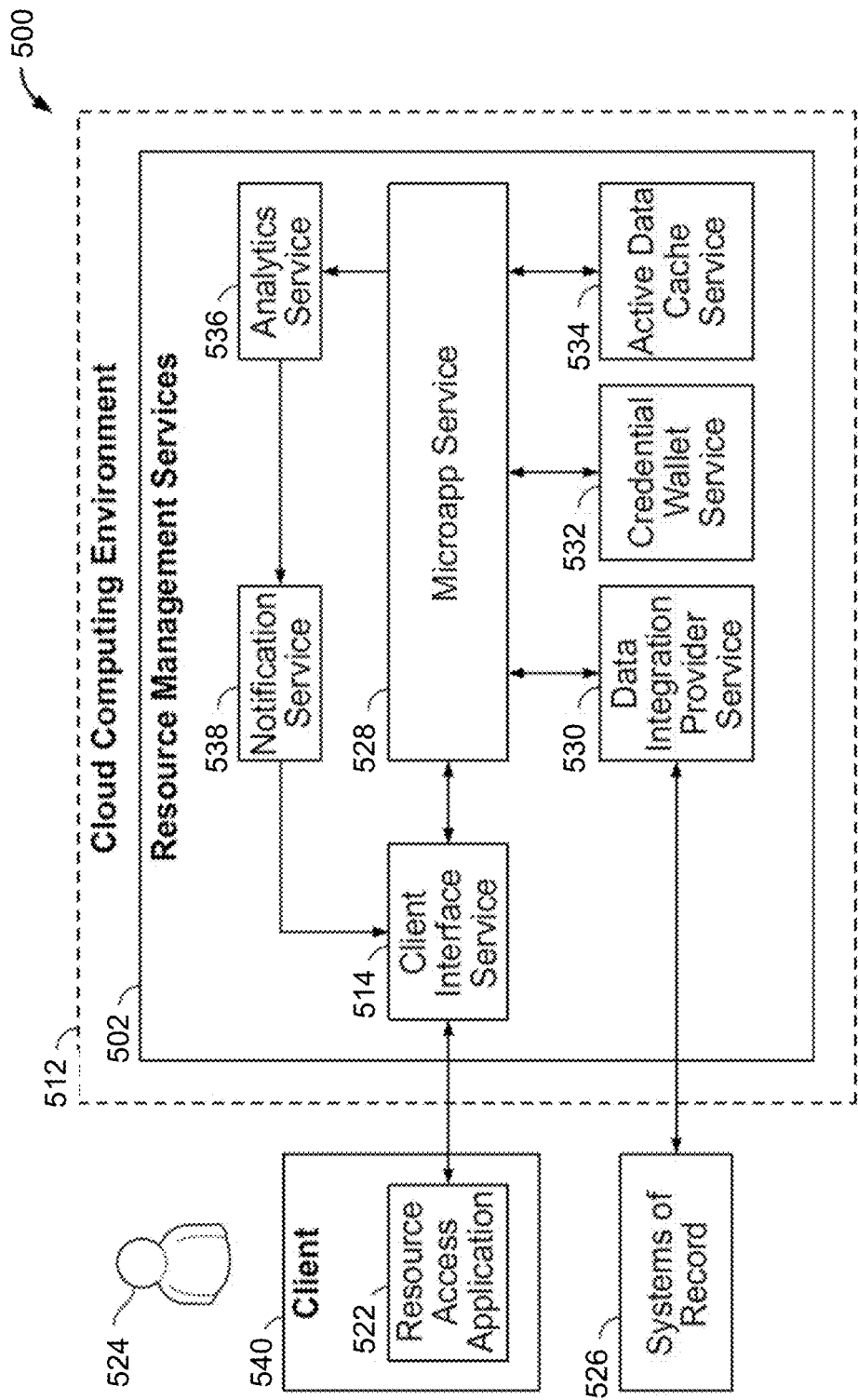

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 540. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI). Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically cause active data to be pulled from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resources being interacted with.

In some embodiments, the analytics service 536 may process the raw events received from the microapp service 528 to create targeted scored notifications and send such notifications to the notification service 538.

In some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 540 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 540 as a push notification to the user 524.

In some embodiments, a process for processing a user-initiated action via a microapp may operate as follows. The client 540 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow user 524 to work efficiently, stay organized, and request only the specific information they need.

Hosted Application Performance

Figure 6:
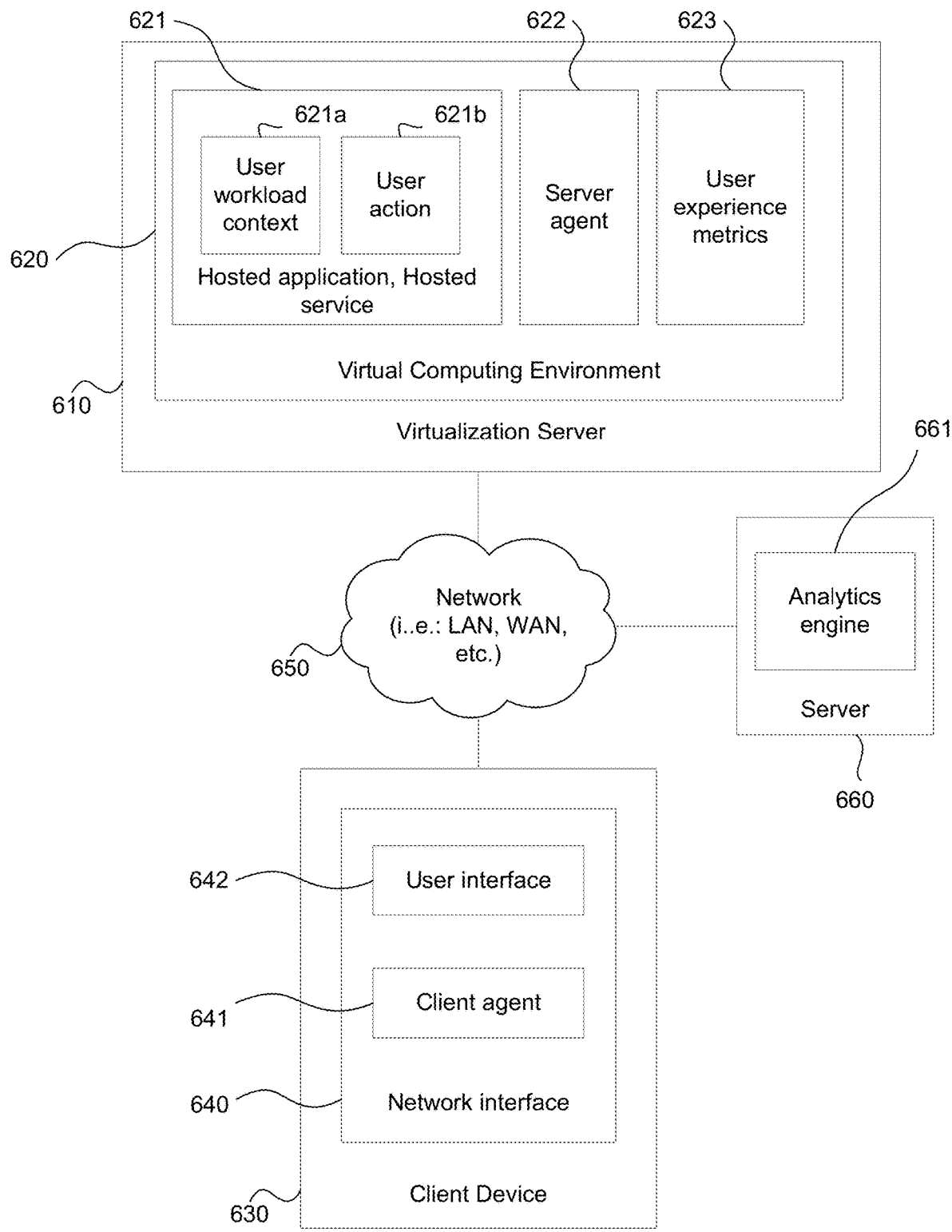
FIG. 6 depicts a client device and server system diagram illustrating various components and modules that can be used to determine application performance and changes thereto in accordance with one or more illustrative aspects described herein.

FIG. 6 illustrates an example of a system configuration including a virtualization server, a client device, a server, and a network. In such embodiments, virtualization server 610 may include virtual computing environment 620. Virtual computing environment 620 may be a virtual workspace that permits users to remotely access computer applications and computer services. One example of virtual computing environment 620 may be Citrix Workspace, discussed in connected with FIGS. 5A-5C, developed by Citrix Systems, Inc. of Ft. Lauderdale, Fla. Virtual computing environment 620 may present, for interaction by a user, computer applications and computer services that traditionally run in physical computing environments, as represented by hosted application and hosted service 621 in FIG. 6 (generally referred to herein as "hosted application 621"). Hosted application 621 may send to virtual computing environment 620 details about user interaction with virtual computing environment 620. In some embodiments, hosted application 621 may send, to virtual computing environment 620, user workload context 621a and user action 621b. Additionally or alternatively, virtual computing environment 620 may collect metrics about user experience 623 corresponding to both user workload context 621a and user action 621b. Information pertaining to metrics 623 may also correspond to performance analytics parameters, such as a frame rate, a round trip latency time, metadata related to the frame rate, an image quality analysis, or an audio quality analysis, to name a few. Information pertaining to metrics 623 will be discussed in detail in connection with FIG. 7.

User workload context 621a may identify the particular hosted application 621, selected by the user, currently running in virtual computing environment 620. In some embodiments, user workload context 621a may correspond to a word processing application, a multimedia consumption application, a web browsing application, or other computer applications. User action 621b may directly correspond to user workload context 621a. User action 621b may identify the particular user gesture that indicates the way in which the user interacts with user workload context 621a. In some embodiments, user action 621b may correspond to clicking a pointing device, typing, scrolling, copying, printing, editing a document, editing an image, viewing three-dimensional content, or other user gestures.

Virtual computing environment 620 may use server agent 622 to communicate with client device 630. In some embodiments, virtual computing environment 620 may use server agent 622 to send, to client device 630, information related to user workload context 621a and information related to user action 621b. Server agent 622 may communicate with client device 630 using network 650.

The network connection depicted in FIG. 6 may include a local area network (LAN), a wide area network (WAN), or other networks. When used in a LAN networking environment, client device 630 may be connected to the LAN through a network interface or adapter. When used in a WAN networking environment, client device 630 may include a modem or other wide area network interface for establishing communications over the WAN. It will be appreciated that the network connections shown are illustrative and other means of establishing a communications link between the virtualization server 610, client device 630, and server 660 may be used.

Client device 630, as illustrated in FIG. 6, may include network interface 640. Network interface 640 may connect client device 630 to network 650 such that client device 630 may communicate across network 650. Network interface 640 may include client agent 641 and user interface 642. Network interface 640 may communicate with server agent 622 within virtual computing environment 620. Server agent 622 may send, to client agent 641, information pertaining to user workload context 621a, information pertaining to user action 621b, and information pertaining to metrics 623, which will be discussed in connection with FIG. 7. In some embodiments, the information received by network interface 640 and from server agent 622 may be displayed on client device 630 using user interface 642. Server agent 622 and client agent 641 may use a remote presentation protocol to send and receive information. Additionally or alternatively, server agent 622 and client agent 641 may use a remote presentation protocol to display the received information on client device 630. The remote protocol may be HDX protocol developed by Citrix Systems, Inc. of Ft. Lauderdale, Fla. Additionally or alternatively, the information received by network interface 640 and from server agent 622 may be stored within client device 630 for use in determination of hosted application performance, as discussed in connection with FIG. 7.

All of virtualization server 610, network 650, and client device 630 may communicate with server 660. Server 660 may include analytics engine 661. Analytics engine 661 may be responsible for determining a quality of service value and hosted application performance. Analytics engine 661 may receive, from virtual computing environment 620, metrics 623 associated with virtual computing environment 620. Additionally or alternatively, analytics engine 661 may receive, from virtual computing environment 620, information pertaining to user workload context 621a and information pertaining to user action 621b. Analytics engine 661, as discussed in connection with FIG. 7, may use the information received from virtual computing environment 620 to assign scores to metrics 623, user workload context 621a, and user action 621b. Analytics engine 661 may use the assigned scores to calculate a measurement of performance of hosted applications.

Figure 7:
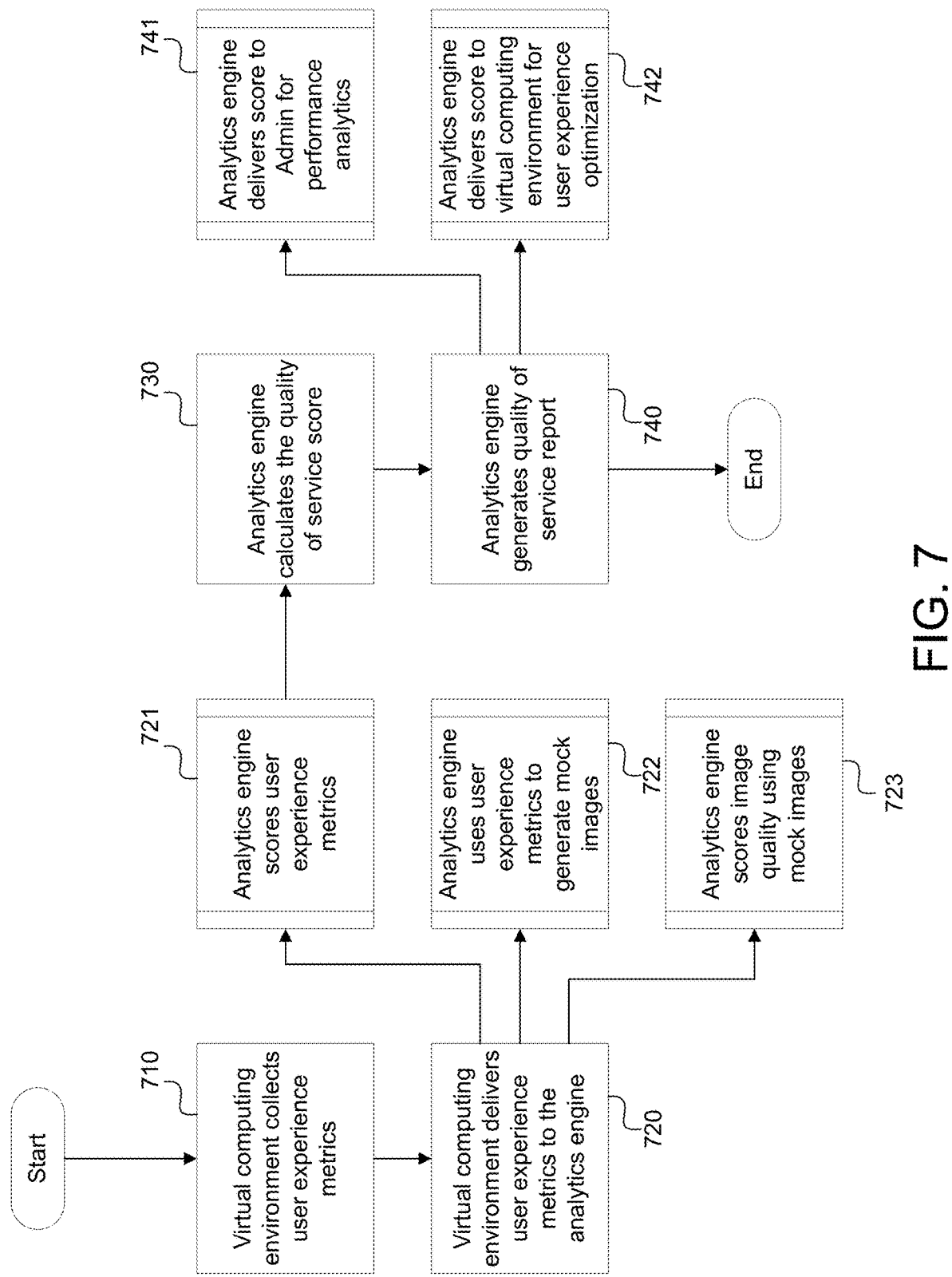
FIG. 7 depicts a flow diagram illustrating steps for determining performance of a hosted application in accordance with one or more illustrative aspects described herein.
Figure 8:
FIG. 8 depicts an illustrative virtual computing environment in which hosted application performance is evaluated in accordance with one or more illustrative aspects described herein.
Figure 9:
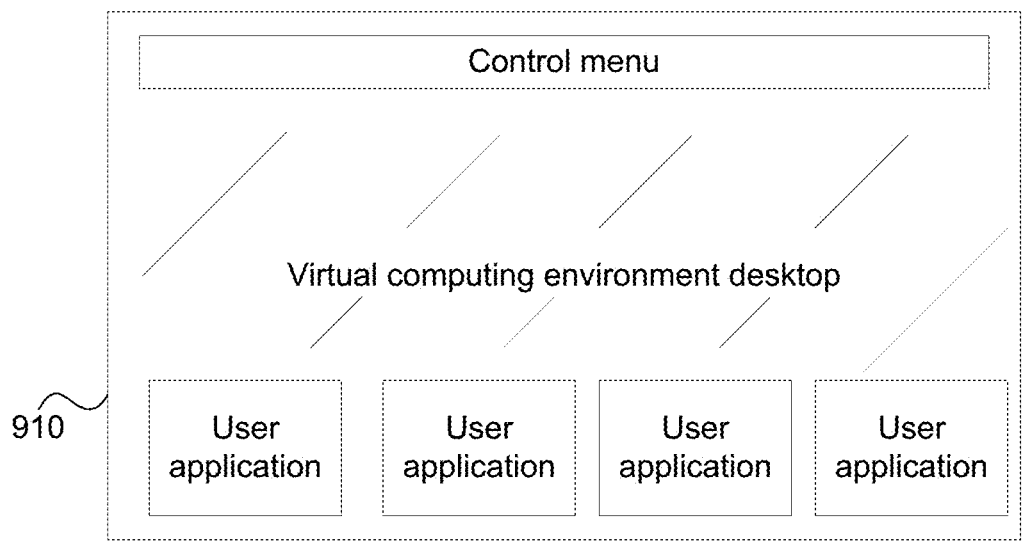
FIG. 9 depicts an illustrative mock image of a virtual computing environment for determining a score indicative of quality of service of a hosted application in accordance with one or more illustrative aspects described herein.

FIG. 7 illustrates a flow diagram of an example method for determining performance of a hosted application. The example method described in FIG. 7 is discussed in further detail in FIGS. 8-13. At step 710, virtual computing environment 620 may collect metrics 623 associated with virtual computing environment 620, discussed in connection with FIG. 6. Information pertaining to metrics 623 may correspond to a frame rate, a round trip latency time, metadata related to the frame rate, an image quality analysis, or an audio quality analysis. Virtual computing environment 620 may store the information within virtualization server 610 or elsewhere as the case may be. Additionally or alternatively, virtual computing environment 620 may send the information to server agent 622. Server agent 622 may retain the information until instructed, by virtual computing environment 620, to send the information to client device 630 or to analytics engine 661.

At step 720, virtual computing environment 620 may send metrics 623 to analytics engine 661. Additionally or alternatively, virtual computing environment 520 may send user workload context 621a and user action 621b to analytics engine 661. Analytics engine 661 may retain the information received from virtual computing environment 620 until instructed to calculate a value indicative of quality of service or performance of a hosted application. Step 721 illustrates a sub-process wherein analytics engine 661 may assign a score to any of metrics 623, user workload context 621a, and user action 621b.

Analytics engine 661 may calculate a score for user workload context 621a by accounting for the complexity of user workload context 621a and the percentage of user interface 642 of client device 630 that is occupied by user workload context 621a. The complexity of user workload context 621a may be based on the functions and services that user workload context 621a makes available to the user. For example, if user workload context 621a is an image editing application, the functions and services made available to the user may include rotating an image, cropping an image, resizing an image, or filtering an image, to name a few. On the other hand, if user workload context 621a is a computer-aided design ("CAD") application, the functions and services made available to the user may include generating 3D models, converting 2D drawings to 3D models, or converting 2D images and 3D models to animations, to name a few. In this comparison, the functions and services that are available to the user in the CAD application may be more complex than the functions and services that are available to the user in the image editing application since the functions and services of the CAD application may require sophisticated calculations and knowledge of the CAD software. Analytics engine 661 may take this information into account when determining the complexity of user workload context 621a. To determine the percentage of user interface 642 of client device 630 that is occupied by user workload context 621a, analytics engine 661 may compare the size of the window displaying user workload context 621a to the size of user interface 642. For example, if the size of the window displaying user workload context 621a matches the size of user interface 642, then analytics engine 661 may determine that the 100% of user interface 642 of client device 630 is occupied by user workload context 621a.

Analytics engine 661 may calculate a score for user action 621b by accounting for the complexity of user action 621b. The complexity of user action 621b may be based on the level of user interaction with user workload context 621a. For example, when analytics engine 661 detects that a user is typing, analytics engine 661 may assign a higher user action 621b score since typing indicates that the user is viewing user workload context 621a and that the user is directly interacting with or supplementing the data within user workload context 621a. On the other hand, when there is no user action 621b detected by analytics engine 661, then analytics engine 661 may assign a lower user action 621b score since there is no indication that the user is interacting with the data within user workload context 621a.

For example, virtual computing environment 620 may inform analytics engine 661 that the user is viewing an image using 100% of user interface 642 of client device 630. Analytics engine 661 may assign user workload context 621a a score of 4, using the table shown in FIG. 13. Analytics engine 661 may assign user action 621b a score of 1, using the table shown in FIG. 12. Virtual computing environment 620 may deliver, to analytics engine 661, scores related to performance analytics pertaining to virtual computing environment 620. The performance analytics may show that the frame rate is 15 frames per second, the round trip latency time is 20 ms, and the image quality is 75%. Analytics engine 661 may use the values of the performance analytics to assign scores to the performance analytics. As such, analytics engine 661 may assign a score of 15 to frame rate, a score of 20 to round trip latency time, and a score of 0.75 to image quality. A constant, k, may be used in all calculations pertaining to a quality of service to normalize the results. In this example, the constant may be 0.3. Analytics engine 661 may use the equation reproduced below, and discussed in detail in connection with step 730, to calculate a quality of service value. Using the equation reproduced below, analytics engine 661 may return a quality of service value of 0.675.

$$\text{Quality of Service} = \frac{\left[k * \left[\text{weighted } avg.\left(\begin{array}{c}\text{user workload context } 621a *\\ \text{user action } 621b\end{array}\right)\right] * [\text{frame rate} * \text{image quality score}]\right]}{\text{Round trip latency time}}$$

$$\text{Quality of Service} = \frac{[0.3 * [4*1] * [15*0.75]]}{20} = 0.675$$

In some embodiments, there may be multiple user workload contexts 621a running within virtual computing environment 620. In such instances, analytics engine 661 may calculate a weighted average of all user workload contexts 621a and all user actions 621b within virtual computing environment 620 using, for example, the 80-20 rule. Using the 80-20 rule, analytics engine 661 may assign 80% of the score associated with user workload context 621a and user action 621b to the application associated with audio consumption or graphics consumption. Analytics engine 661 may assign the remaining 20% of the score associated with user workload context 621a and user action 621b to the application that is unrelated to graphics or audio consumption.

In doing so, analytics engine 661 may analyze individual user workload contexts 621a separately. Analytics engine 661 may take the first user workload context 621a running within virtual computing environment 620 and assign a user workload context 621a score using the table shown in FIG. 13 as well a user action 621b score using the table shown in FIG. 12. Analytics engine 661 may take the product of user workload context 621a and user action 621b for individual user workload context 621a running within virtual computing environment 620. Analytics engine 661 may repeat this process for other user workload contexts 621a as needed or as otherwise desired. Analytics engine 661 may identify the user workload context 621a related to audio consumption or graphics consumption as well as the user workload context 621a unrelated to audio or graphics consumption. Analytics engine 661 may implement the 80-20 rule: the product associated with an audio consumption application may be weighted 80% and the product unrelated to an audio consumption application may be weighted 20%. Analytics engine 661 may add the product associated with an audio consumption application that was weighted 80% to the product unrelated to an audio consumption application that was weighted 20% to arrive at a final score pertaining to user workload context 621a and user action 621b.

For example, analytics engine 661 may determine that there are two user workload contexts 621a running within virtual computing environment 620. The first user workload context 621a may be a document rendering application that appears on half of user interface 642 of client device 630, and wherein the user is typing within the rendered document. Using the tables shown in FIGS. 12-13, analytics engine 661 may determine that the first user workload context 621a receives a score of 5 and user action 621b associated with the first user workload context 621a receives a score of 4. Analytics engine 661 may determine that the document rendering application is unrelated to audio or graphics consumption and, as such, may be weighted 20% of the final score pertaining to user workload context 621a and user action 621b. Analytics engine 661 may multiply the score given to the first user workload context 621a by the score given to user action 621b associated with the first user workload context 621a, and may take 20% of the product.

Analytics engine 661 may determine that the first user workload context 621a receives a score of 2. The second user workload context 621a may be a video consumption application that appears on half of user interface 642 of client device 630 and wherein the user is not interacting with the video consumption application. Using the tables shown in FIGS. 12-13, analytics engine 661 may determine that the second user workload context 621a receives a score of 4 and user action 621b associated with the second user workload context 621a receives a score of 1. Analytics engine 661 may determine that the video consumption application is related to audio and graphics consumption and, as such, may be weighted 80% of the final score pertaining to user workload context 621a and user action 621b. Analytics engine 661 may multiply the score given to the second user workload context 621a by the score given to user action 621b associated with the second user workload context 621a, and may take 80% of the product. Analytics engine 661 may determine that the second user workload context 621a receives a score of 1.6. Analytics engine 661 may add the score related to the document rendering application to the score related to the video consumption application to arrive at an overall user workload context 621a and user action 621b score of 3.6. Analytics engine 661 may receive, from virtual computing environment 620, performance analytics pertaining to virtual computing environment 620. The performance analytics may show that the frame rate is 15 frames per second, the round trip latency time is 20 ms, and the image quality is 75%. Analytics engine 661 may use the values of the performance analytics to assign scores to the performance analytics. As such, analytics engine 661 may assign a score of 15 to frame rate, a score of 20 to round trip latency time, and a score of 0.75 to image quality. A constant, k, may be used in all calculations pertaining to a quality of service to normalize the results. In this example, the constant may be 0.3. Analytics engine 661 may use the equation reproduced below, and discussed in detail in connection with step 730, to calculate a quality of service value. Using the equation reproduced below, analytics engine 661 may return a quality of service value of 0.6075.

Quality of Service =

$$\frac{\left[k*\left[\text{weighted } avg.\binom{\text{user workload context } 621a *}{\text{user action } 621b}\right]*\right]}{\text{Round trip latency time}}$$

Quality of Service =

$$\frac{[0.3*[(0.8)*(2*1)+(0.2)*(2.5*4)]*[15*0.75]]}{20} = 0.6075$$

In some embodiments, analytics engine 661 may assign a score to different attributes or components of metrics 623. Information pertaining to metrics 623 may correspond to a frame rate, a round trip latency time, metadata related to the frame rate, an image quality analysis, or an audio quality analysis. The scores assigned to any one of these attributes of metrics 623 may be generated by virtual computing environment 620 as metrics 623 correspond to underlying performance analytics commonly maintained in computing environments. For example, virtual computing environment 620 may calculate the frame rate by dividing the number of frames rendered by the number of seconds that have passed. Virtual computing environment 620 may calculate the round trip latency time by measuring how long it takes a request to travel from virtualization server 610 to client device 630. Analytics engine 661 may receive values pertaining to the frame rate and the round trip latency time from virtual computing environment 620. Analytics engine 661 may use the received value pertaining to frame rate as the frame rate score used to determine hosted application performance. Analytics engine 661 may use the received value pertaining to round trip latency time as the round trip latency time score used to determine hosted application performance.

Virtual computing environment 620 may send, to analytics engine 661, metadata related to the frame rate. The metadata related to the frame rate may include the image codec used to generate the frame, the dirty rectangles used to generate the frame, or the solid to fill ratio used to generate the frame. Additionally or alternatively, virtual computing environment 620 may apply or otherwise initiate an image quality analysis or an audio quality analysis, as discussed in connection with step 723. Analytics engine 661 may receive the image quality analysis and audio quality analysis from virtual computing environment 620 and record them as the scores associated with both image quality analysis and audio quality analysis, respectively. Analytics engine 661 may use the value of the image quality analysis as the score associated with image quality, as discussed in connection with step 723. Analytics engine 661 may use the value of the audio quality analysis as the score associated with audio quality.

Step 722 illustrates a sub-process wherein analytics engine 661 uses the scores assigned in step 721 to generate mock images of user workload context 621a. Analytics engine 661 may generate mock image 910 shown in FIG. 9 to duplicate what the user perceives in user workload context 621a of virtual computing environment 620, represented by user workload context image 810 of FIG. 8. Mock image 910 that is generated by analytics engine 661 might not duplicate the exact content that is displayed to the user within user workload context 621a of virtual computing environment 620. Instead, mock image 910 may duplicate the image codec used to generate user workload context image 810, the dirty rectangles used to generate user workload context image 810, and the solid to fill ratio used to generate user workload context image 810 without revealing the content of user workload context image 810 presented within virtual computing environment 620. In short, mock image 910 can be an approximation of user workload context image 810 useful to assess a load applied to an application, but without duplication of the image in its entirety. Mock image 910 allows the system to more quickly and efficiently perform image processing. Mock image 910 thereby represents the image quality perceived by the user, without including any images depicting the user's actual session. For example, user workload context image 810 depicts a MAC computing environment wherein the computing environment presents computer applications along the bottom of the screen and a control menu along the top of the screen. User workload context image 810 corresponds to what the user perceives when operating within virtual computing environment 620. Mock image 910 represents a reconstructed version of user workload context image 810 wherein the specific content of user workload context image 810 is removed.

In step 723, analytics engine 661 may use mock image 910 to calculate a score indicative of image quality. Analytics engine 661 may calculate multiple scores indicative of image quality for mock image 910 by changing the noise level used to generate user workload context image 810 of user workload context 621a. The noise level within an image may refer to the density of the pixels at various locations within the image that comprise the overall image. For example, areas of an image that appear lighter in color than the rest of the image may have a lower pixel density. The lower pixel density may cause that particular area of the image to appear lighter in color. On the other hand, areas of an image that appear darker in color than the rest of the image may have a higher pixel density. The higher pixel density may cause that particular area of the image to appear darker in color.

Analytics engine 661 may utilize methods in the field, such as Blind/Referenceless Image Spatial Quality Evaluator (generally referred to herein as "BRISQUE") and Conventional Neural Networks (generally referred to herein as "CNN"), to vary the noise level used to calculate the score indicative of image quality. Using either BRISQUE or CNN, analytics engine 661 may alter the noise in mock image 910. For example, analytics engine 661 may use Gauss noise level 1020, Poisson noise level 1030, Salt & Pepper noise level 1040, or Speckle noise level 1050 to generate mock image 910 of user workload context 621*a*. Analytics engine 661 may calculate a score indicative of image quality for individual noise levels used to generate mock image 910 of user workload context 621*a*, as illustrated in FIG. 10.

In some embodiments, analytics engine 661 may calculate the score indicative of image quality using Gauss noise level 1020 by blurring user workload context image 810 in accordance with a Gaussian distribution. Gaussian distributions may contain a density distribution that is equal to a normal distribution. Additionally or alternatively, analytics engine 661 may calculate the score using Poisson noise level 1030 by obtaining and modifying an image gradient in accordance with Poisson's equation. Poisson noise level 1030 may track the random fluctuation of photons within the image, which may cause areas of the image that were once dark to appear lighter, and vice versa. Additionally or alternatively, analytics engine 661 may calculate the score using Salt & Pepper noise level 1040 by monitoring the appearance of black and white pixels on user workload context image 810, wherein the pixels represent instances of interference on user workload context image 810. Salt & Pepper noise level 1040 is added to an image by randomly adding light pixels and dark pixels to an image. Analytics engine 661 may use a median filter to remove the light and dark pixels that were added to the image. Additionally or alternatively, analytics engine 661 may calculate the score using Speckle noise level 1050 by monitoring the bright and dark spots on user workload context image 810, wherein the bright and dark spots represent instances of signal interference on user workload context image 810. Speckle noise level 1050 is added by multiplying different pixels within an image by random pixel values. After applying one of the noise levels, analytics engine 661 may assign a low image quality score where there is high image quality and a high image quality score where there is low image quality.

At step 730, analytics engine 661 may calculate the quality of service value. To calculate the quality of service value, analytics engine 661 may gather the scores assigned to user workload context 621*a*, user action 621*b*, metrics 623, image quality, and a constant used to normalize the data. Analytics engine 661 may determine the quality of service value using the equation, shown below, discussed in connection with step 721.

Quality of Service =

$$\frac{\left[k * \left[\text{weighted } avg.\left(\begin{array}{c}\text{user workload context } 621a * \\ \text{user action } 621b\end{array}\right)\right] * \right]}{\text{Round trip latency time}}$$

FIG. 11 illustrates example parameters that analytics engine 661 may use to calculate the quality of service value. Analytics engine 661 may use scores associated with user workload context 621*a*, user action 621*b*, frame rate, round trip latency time, and image quality, as illustrated in FIG. 11. Analytics engine 661 may determine the scores associated with user workload context 621*a* and user action 621*b* using the tables shown in FIGS. 12-13 as well as the scoring methods discussed in connection with step 721. FIG. 12 depicts sample user action 621*b* and the associated scores. FIG. 13 depicts sample user workload context 621*a* and the associated scores. For example, where a user uses virtual computing environment 620 for full-screen document rendering, user workload context 621*a* may receive a score of 5, as represented by UWC 1101. Where a user uses virtual computing environment 620 to type in the rendered document, user action 621*b* may receive a score of 4, as represented by UA 1102. Analytics engine 661 may receive FR 1103 and RTLT 1104 from virtual computing environment 620, as discussed in connection with step 720. Analytics engine 661 may use the received value of FR 1103 as the frame rate score. Analytics engine 661 may use the received value of RTLT 1104 as the round trip latency time score. Analytics engine 661 may calculate the image quality score using the methods discussed in connection with step 723. In this example, FR 1103 may receive a value of 15, RTLT 1104 may receive a value of 20, and ImQ 1105 may receive a value of 75% or 0.75. As such, the score associated with frame rate may be 15, the score associated with round trip latency time may be 20, and the score associated with image quality may be 0.75. A constant, k, may be used in all calculations pertaining to a quality of service to normalize the results. In this example, the constant may be 0.3. Analytics engine 661 may use these scores to calculate the quality of service value, as shown below.

Quality of Service =

$$\frac{\left[k * \left[\text{weighted } avg.\left(\begin{array}{c}\text{user workload context } 621a * \\ \text{user action } 621b\end{array}\right)\right] * \right]}{\text{Round trip latency time}}$$

$$\text{Quality of Service} = \frac{[0.3 * [5 * 4] * [15 * 0.75]]}{20} = 3.375$$

At step 740, analytics engine 661 may generate a quality of service data (e.g., a report) after calculating the quality of service value. The data may identify the parameters that were used to calculate the quality of service value. The data may also identify the scores associated with individual parameters used to calculate the quality of service value. The data may include a breakdown of the calculations that analytics engine 661 performed to arrive at the quality of service value. The data may further identify the quality of service value.

The data indicative of quality of service may include information for the administrator of virtualization server 610. Such information may include performance analytics details corresponding to virtual computing environment 620.

The performance analytics details may include a breakdown of user workload context 621a and user action 621b. Analytics engine 661 may use the breakdown of user workload context 621a and user action 621b to educate the administrator about the computer applications that the user uses the most as well as the user gestures that the user performs the most. Analytics engine 661 may use the breakdown of user workload context 621a and user action 621b to educate the administrator about the applications and corresponding user gestures that may impact the quality of service value. Analytics engine 661 may indicate, within the data, methods for optimizing user experience within virtual computing environment 620.

Methods for optimizing user experience within virtual computing environment 620 may include tracking, by analytics engine 661, user workload context 621a and user action 621b that were previously identified as well as user workload context 621a and user action 621b presently identified. Analytics engine 661 may use data from prior analyses and present data to predict user workload context 621a that a user may use in the future and to predict user action 61b that a user may perform in the future. Analytics engine 661 may use these predictions to prepare user workload context 621a to handle future user action 621b within virtual computing environment 620. Additionally or alternatively, methods for optimizing user experience within virtual computing environment 620 may include resetting the visual settings within virtual computing environment 620 such that the visual settings within virtual computing environment 620 match the quality of service value. Additionally or alternatively, methods for optimizing user experience within virtual computing environment 620 may include tailoring virtual computing environment 620 based on the quality of service value. For example, where a user typically launches a web browsing application within virtual computing environment 620 during morning hours, virtual computing environment 620 may ensure the web browsing application is optimized for user performance during the predicted hours of use.

Step 741 illustrates a sub-process wherein analytics engine 661 delivers performance analytics information, discussed in connection with step 740, to the administrator of virtualization server 610 or a third party resource provider. Step 742 illustrates a sub-process wherein analytics engine 661 delivers methods for user experience optimization, discussed in connection with step 740, to virtual computing environment 620.

Figure 14:
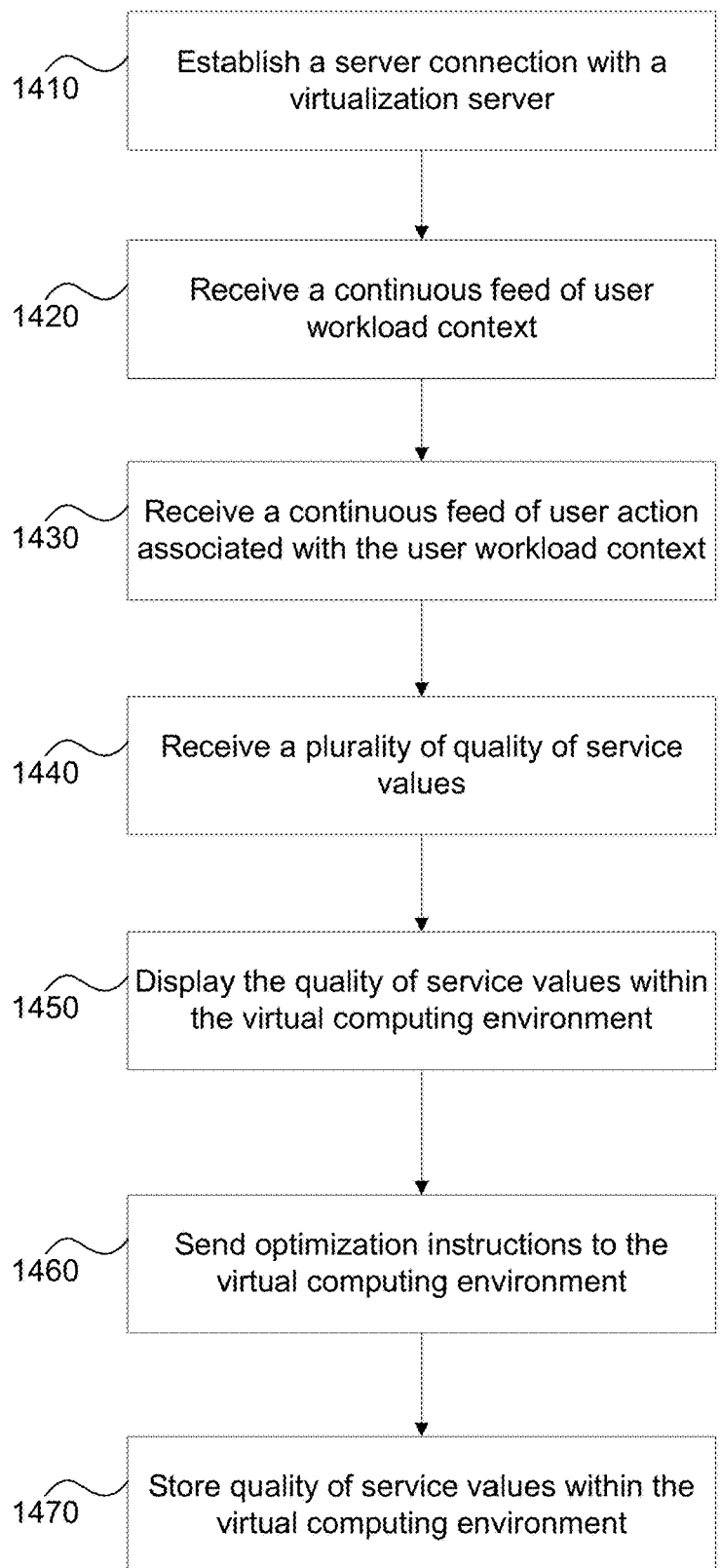
FIG. 14 depicts a server system flow diagram illustrating steps for determination of performance of hosted applications in accordance with one or more illustrative aspects described herein.

In alternative embodiments, the steps and sub-processes described above may be performed from the point of view of server 660. FIG. 14 illustrates a flow diagram depicting the previously described method from the point of view of server 660. Server 660 may comprise analytics engine 661. At step 1410, server 660 may establish a connection with virtualization server 610. Server 660 may be connected to virtualization server 610 through network 650, which may be a local area network, a wide area network (e.g., the Internet), via direct or indirect connection, or some other network, as discussed in connection with FIG. 6.

At step 1420, server 660 may receive a user workload context 621a (e.g., via a continuous feed). User workload context 621a may be used, by analytics engine 661, to calculate a quality of service value. In some examples, with the use of the continuous feed of user workload context 621a, analytics engine 661 may calculate the quality of service value at any instant using any iteration of user workload context 621a. At step 1430, server 660 may receive data about user action 621b. User action 621b may be used, by analytics engine 661, to calculate the quality of service value. The analytics engine 661 may calculate the quality of service value at any instant using any iteration of user action 621b. Server 660 may use user workload context 621a and user action 621b to calculate the quality of service value at any instant using the method described in connection with step 730.

At step 1440, server 660 may receive, from analytics engine 661, a plurality of values for quality of service. Each value may be calculated by analytics engine 661 using the method described in connection with step 730.

At step 1450, server 660 may communicate with virtual computing environment 620 to cause the display of the plurality of quality of service values within virtual computing environment 620. The plurality of quality of service values displayed within virtual computing environment 620 may be displayed to provide the user with a brief breakdown of the performance analytics corresponding to virtual computing environment 620. Additionally or alternatively, the plurality of quality of service values displayed within virtual computing environment 620 may be displayed to provide the administrator of virtualization server 610 with the performance analytics corresponding to virtual computing environment 620 such that the administrator of virtualization server 610 may engage the user experience optimization methods discussed in connection with step 740.

At step 1460, server 660 may send user experience optimization instructions to virtual computing environment 620. User experience optimization instructions may be generated by server 660 in view of the quality of service value that is calculated by analytics engine 661. User experience optimization instructions may include instructions for tracking, by analytics engine 661, user workload context 621a and user action 621b addressed in quality of service data generated by analytics engine 661. Analytics engine 661 may use the quality of service data to predict user workload context 621a that a user may launch in the future and to predict user action 621b that a user may perform in the future. Analytics engine 661 may use these predictions to prepare virtual computing environment 620 to handle predicted user actions 621b associated with predicted user workload contexts 621a. Additionally or alternatively, methods for optimizing user experience within virtual computing environment 620 may include instructions for resetting the visual settings within virtual computing environment 620 such that the visual settings within virtual computing environment 620 match the quality of service value. Additionally or alternatively, methods for optimizing user experience within virtual computing environment 620 may include instructions for tailoring virtual computing environment 620 based on the quality of service value.

At step 1470, server 660 may store the plurality of quality of service values within virtual computing environment 620. Server 660 may use the stored values to generate predictions about the user workload context 621a that a user may execute in the future as well as to generate predictions about the user action 621b that a user may execute in the future. Server 660 may use such predictions to prepare virtual computing environment 620 to handle the user workload context 621a and user action 621b that a user may execute in the future. Additionally or alternatively, server 660 may use the plurality of quality of service values to implement the methods for user experience optimization discussed in connection with step 1460.

The following paragraphs (M1) through (M20) describe examples of methods that may be implemented in accordance with the present disclosure.

(M1) A method comprising:
  determining, by a computing device, a level of quality of an image displayed with use of an application hosted on a remote computing device, the determination including use of a mock image representative of the image, and the mock image including less than all content of the image;
  determining, by the computing device, a value for the application indicative of a level of performance of the application based on the determined level of quality of the image and data about a current use of the application; and
  initiating, by the computing device, a change in delivery of the application to a client device based on the determined value, so as to address a degradation in usability of the application.

(M2) A method may be performed as described in paragraph (M1) further comprising receiving, by the computing device, a plurality of metrics corresponding to one or more of:
  a frame rate;
  a round trip latency time;
  metadata related to the frame rate;
  an image quality analysis; and
  an audio quality analysis.

(M3) A method may be performed as described in any of paragraphs (M1) through (M2) wherein determining the level of quality of the image comprises altering a noise level within the image, the noise level corresponding to a pixel density within the image.

(M4) A method may be performed as described in any of paragraphs (M1) through (M3) further comprising detecting a user action corresponding to a user interaction with the application, wherein the user action corresponds to one or more of:
  scrolling;
  typing;
  clicking;
  copying;
  printing;
  consuming multimedia content;
  document rendering and editing;
  web browsing; or
  viewing three-dimensional content.

(M5) A method may be performed as described in any of paragraphs (M1) through (M4) wherein the mock image is generated using metadata corresponding to the image, wherein the metadata corresponds to one or more of:
  a codec;
  an image quality analysis;
  dirty rectangles; or
  a solid to fill ratio.

(M6) A method may be performed as described in any of paragraphs (M1) through (M5) wherein determining the value for the application indicative of the level of performance comprises:
  measuring a complexity level of the application; and
  measuring a percentage of a user interface of the computing device that is occupied by the application.

(M7) A method may be performed as described in any of paragraphs (M1) through (M6) wherein determining the value for the application indicative of the level of performance further comprises measuring a level of complexity of a user interaction with the application.

(M8) A method may be performed as described in any of paragraphs (M1) through (M7) further comprising optimizing, based on the value for the application indicative of the level of performance of the application, the application to enhance user experience, wherein optimizing the application comprises:
  storing a plurality of values for the application indicative of a level of performance of the application;
  using the stored plurality of values to predict:
    the application that a user will run; and
    a user action that the user will perform; and
  preparing the predicted application to support the predicted user action.

(M9) A method may be performed as described in any of paragraphs (M1) through (M8) wherein calculating the value for the application indicative of the level of performance of the application comprises:
  determining a weighted average of the value for the application indicative of a level of performance of the application and a value associated with a user action; and
  weighting the weighted average against a constant, a frame rate, an image quality score, and a round trip latency time.

(M10) A method comprising:
  establishing, by a server, a connection with a virtualization server;
  receiving, by the server and from a virtual computing environment within the virtualization server, a continuous feed of a first user experience metric corresponding to an application within the virtual computing environment;
  receiving, by the server, a second continuous feed of a second user experience metric corresponding to a user action within the application;
  receiving, by the server and from an analytics engine, a plurality of quality of service values;
  displaying, by the server, the plurality of quality of service values within the virtual computing environment;
  sending, by the server and to the virtual computing environment, instructions to optimize, based on the plurality of quality of service values, the application to enhance user experience within the virtual computing environment; and
  storing, by the server, the plurality of quality of service values within the virtual computing environment.

(M11) A method may be performed as described in paragraph (M10) wherein the instructions to optimize the application comprise one or more of:
  preparing the application to receive the user action, wherein preparing the application comprises:
    identifying a most-used application;
    identifying a most-performed user action;
    preparing the virtual computing environment to run the most-used application; and
    preparing the virtual computing environment to receive the most-performed user action;
  resetting visual settings within the virtual computing environment, wherein the visual settings match a quality of service value of the application; or
  creating a custom virtual computing environment, wherein the custom virtual computing environment is generated using the quality of service value of the application, the most-used application, and the most-performed user action.

(M12) A method may be performed as described in any of paragraphs (M10) through (M11) wherein the user action indicates a user interaction with the application, wherein the user action corresponds to one or more of:
  scrolling;

typing;
clicking;
copying;
printing;
consuming multimedia content;
document rendering and editing;
web browsing; or
viewing three-dimensional content.

(M13) A method may be performed as described in any of paragraphs (M10) through (M12) wherein calculating the plurality of quality of service values comprises:
  determining a weighted average of a value for the application indicative of a level of performance of the application and a value associated with a user action; and
  weighting the weighted average against a constant, a frame rate, an image quality score, and a round trip latency time.

(M14) A method comprising:
  calculating, by a computing device, a complexity level of an application;
  calculating, by the computing device, a complexity level of a user action;
  determining, by a computing device, a value for a level of performance of the application, the value based on the calculated complexity level of the application and the calculated complexity level of the user action; and
  optimizing, by the computing device, performance of a virtual computing environment based on the determined value.

(M15) A method may be performed as described in paragraph (M14) wherein calculating the complexity level of the application comprises identifying functions and services provided to a user by the application.

(M16) A method may be performed as described in any of paragraphs (M14) through (M15) wherein calculating the complexity level of the user action comprises measuring a level of user interaction with the application.

(M17) A method may be performed as described in any of paragraphs (M14) through (M16) wherein the user action indicates a user interaction with the application, wherein the user action corresponds to one or more of:
  scrolling;
  typing;
  clicking;
  copying;
  printing;
  consuming multimedia content;
  document rendering and editing;
  web browsing; or
  viewing three-dimensional content.

(M18) A method may be performed as described in any of paragraphs (M14) through (M17) wherein determining the value for the level of performance of the application comprises:
  determining a weighted average of the value for the level of performance of the application and a value associated with the user action; and
  weighting the weighted average against a constant, a frame rate, an image quality score, and a round trip latency time.

(M19) A method may be performed as described in any of paragraphs (M14) through (M18) wherein determining the value for the level of performance of the application further comprises receiving, by the computing device, a plurality of metrics corresponding to one or more of:
  a frame rate;
  a round trip latency time;
  metadata related to the frame rate;
  an image quality analysis; and
  an audio quality analysis.

(M20) A method may be performed as described in any of paragraphs (M14) through (M19) wherein the optimizing performance of the virtual computing environment comprises one or more of:
  preparing the application to receive the user action, wherein preparing the application comprises:
    identifying a most-used application;
    identifying a most-performed user action;
    preparing the virtual computing environment to run the most-used application; and
    preparing the virtual computing environment to receive the most-performed user action;
  resetting visual settings within the virtual computing environment, wherein the visual settings match the value for the level of performance of the application; or
  creating a custom virtual computing environment, wherein the custom virtual computing environment is generated using the value for the level of performance of the application, the most-used application, and the most-performed user action.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
  determining, by a computing device, a level of quality of an image displayed with use of an application hosted on a remote computing device, the determination including use of a mock image representative of the image, and the mock image including less than all content of the image;
  determining, by the computing device, a value for the application indicative of a level of performance of the application based on the determined level of quality of the image and data about a current use of the application;
  changing, by the computing device, one or more visual settings of the application based on the determined value, to improve performance of the application; and
  delivering, by the computing device, the application based on changed one or more visual settings to a client device.

2. The method of claim 1, further comprising receiving, by the computing device, a plurality of metrics corresponding to one or more of:
  a frame rate;
  a round trip latency time;
  metadata related to the frame rate;
  an image quality analysis; and
  an audio quality analysis.

3. The method of claim 1, wherein determining the level of quality of the image comprises altering a noise level within the image, the noise level corresponding to a pixel density within the image.

4. The method of claim 3, wherein the noise level within the image is determined by using neural networks.

5. The method of claim 1, further comprising detecting a user action corresponding to a user interaction with the application, wherein the user action corresponds to one or more of:
   scrolling;
   typing;
   clicking;
   copying;
   printing;
   consuming multimedia content;
   document rendering and editing;
   web browsing; or
   viewing three-dimensional content.

6. The method of claim 1, wherein the mock image is generated using metadata corresponding to the image, wherein the metadata corresponds to one or more of:
   a codec;
   an image quality analysis;
   dirty rectangles; or
   a solid to fill ratio.

7. The method of claim 1, wherein determining the value for the application indicative of the level of performance comprises:
   measuring a complexity level of the application; and
   measuring a percentage of a user interface of the computing device that is occupied by the application.

8. The method of claim 1, wherein determining the value for the application indicative of the level of performance further comprises measuring a level of complexity of a user interaction with the application.

9. The method of claim 1, further comprising optimizing, based on the value for the application indicative of the level of performance of the application, the application to enhance user experience, wherein optimizing the application comprises:
   storing a plurality of values for the application indicative of a level of performance of the application;
   using the stored plurality of values to predict:
      the application that a user will run; and
      a user action that the user will perform; and
   preparing the predicted application to support the predicted user action.

10. The method of claim 1, wherein calculating the value for the application indicative of the level of performance of the application comprises:
   determining a weighted average of the value for the application indicative of a level of performance of the application and a value associated with a user action; and
   weighting the weighted average against a constant, a frame rate, an image quality score, and a round trip latency time.

11. The method of claim 10, wherein calculating the value (QoS) for the application indicative of the level of performance of the application uses the formula:

$$QoS=[k*[\text{weightedavg.}(\text{userworkloadcontext}*\text{useraction})]*[\text{framerate}*\text{imagequalityscore}]]/\text{Roundtriplatencytime}$$

where k is the constant.

12. One or more non-transitory computer readable storage media comprising computer executable instructions that, when executed by a processor, configure a computing device to perform:
   determining, by the computing device, a level of quality of an image displayed with use of an application hosted on a remote computing device, the determination including use of a mock image representative of the image, and the mock image including less than all content of the image;
   determining, by the computing device, a value for the application indicative of a level of performance of the application based on the determined level of quality of the image and data about a current use of the application;
   changing, by the computing device, one or more visual settings of the application based on the determined value, to improve performance of the application; and
   delivering, by the computing device, the application based on changed one or more visual settings to a client device.

13. The computer readable storage media of claim 12, further comprising receiving, by the computing device, a plurality of metrics corresponding to one or more of:
   a frame rate;
   a round trip latency time;
   metadata related to the frame rate;
   an image quality analysis; and
   an audio quality analysis.

14. The computer readable storage media of claim 12, wherein determining the level of quality of the image comprises altering a noise level within the image, the noise level corresponding to a pixel density within the image.

15. The computer readable storage media of claim 12, further comprising detecting a user action corresponding to a user interaction with the application, wherein the user action corresponds to one or more of:
   scrolling;
   typing;
   clicking;
   copying;
   printing;
   consuming multimedia content;
   document rendering and editing;
   web browsing; or
   viewing three-dimensional content.

16. The computer readable storage media of claim 12, wherein the mock image is generated using metadata corresponding to the image, wherein the metadata corresponds to one or more of:
   a codec;
   an image quality analysis;
   dirty rectangles; or
   a solid to fill ratio.

17. The computer readable storage media of claim 12, wherein determining the value for the application indicative of the level of performance comprises:
   measuring a complexity level of the application; and
   measuring a percentage of a user interface of the computing device that is occupied by the application.

18. The computer readable storage media of claim 12, wherein determining the value for the application indicative of the level of performance further comprises measuring a level of complexity of a user interaction with the application.

19. The computer readable storage media of claim 12, further comprising optimizing, based on the value for the application indicative of the level of performance of the application, the application to enhance user experience, wherein optimizing the application comprises:
   storing a plurality of values for the application indicative of a level of performance of the application;
   using the stored plurality of values to predict:
      the application that a user will run; and
      a user action that the user will perform; and preparing the predicted application to support the predicted user action.

20. The computer readable storage media of claim 12, wherein calculating the value for the application indicative of the level of performance of the application comprises:

determining a weighted average of the value for the application indicative of a level of performance of the application and a value associated with a user action; and weighting the weighted average against a constant, a frame rate, an image quality score, and a round trip latency time.

21. The computer readable storage media of claim 20, wherein calculating the value (QoS) for the application indicative of the level of performance of the application uses the formula:

$$QoS=[k*[\text{weightedavg.}(\text{userworkloadcontext}*\text{useraction})]*[\text{framerate}*\text{imagequalityscore}]]/\text{Roundtriplatencytime}$$

where k is the constant.

* * * * *